US009709657B2

(12) United States Patent
Kwon et al.

(10) Patent No.: US 9,709,657 B2
(45) Date of Patent: Jul. 18, 2017

(54) APPARATUS AND METHOD FOR ESTIMATING DIRECTION OF RADIO FREQUENCY SIGNAL

(71) Applicant: ELECTRONICS AND TELECOMMUNICATIONS RESEARCH INSTITUTE, Daejeon (KR)

(72) Inventors: YoungHyoun Kwon, Daejeon (KR); JiEun Choi, Daejeon (KR); HuiRae Cho, Daejeon (KR); Jaeki Lee, Daegu (KR); Heesun Park, Daejeon (KR); Jingak Jang, Daejeon (KR); Jinhyun Kim, Seoul (KR); Jieun Kim, Daejeon (KR); Inho Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 474 days.

(21) Appl. No.: 14/466,976

(22) Filed: Aug. 23, 2014

(65) Prior Publication Data
US 2015/0268325 A1 Sep. 24, 2015

(30) Foreign Application Priority Data

Mar. 20, 2014 (KR) .................. 10-2014-0032554

(51) Int. Cl.
*G01S 5/04* (2006.01)
*G01S 3/14* (2006.01)

(52) U.S. Cl.
CPC .................. *G01S 3/14* (2013.01)

(58) Field of Classification Search
CPC .................................. G01S 5/04; G01S 3/14
USPC ........................................................ 342/442
See application file for complete search history.

(56) References Cited

U.S. PATENT DOCUMENTS

| 9,319,896 B2* | 4/2016 | Liu | H04W 24/02 |
| 2002/0024975 A1 | 2/2002 | Hendler | |
| 2005/0110641 A1* | 5/2005 | Mendolia | G01S 5/04 340/572.7 |

(Continued)

FOREIGN PATENT DOCUMENTS

| CN | 101394024 B | * | 9/2012 |
| JP | 03078429 A | * | 4/1991 |

(Continued)

*Primary Examiner* — Harry Liu
(74) *Attorney, Agent, or Firm* — LRK Patent Law Firm

(57) ABSTRACT

An apparatus and method for estimating a direction of an RF signal are provided. The apparatus includes an antenna unit, a preliminary correction unit, a signal processing unit, a conversion unit, and a signal direction estimation unit. The antenna unit receives an RF signal from at least one antenna. The preliminary correction unit performs preliminary correction depending on whether the at least one antenna is an antenna having directional gain. The signal processing unit generates an analog signal by performing a frequency shift on the RF signal or a signal on which the preliminary correction has been performed. The conversion unit converts the analog signal into a digital sample. The signal direction estimation unit extracts the phase of the antenna from the digital sample, and estimates the direction of the RF signal based on the extracted phase.

6 Claims, 9 Drawing Sheets

(56) References Cited

U.S. PATENT DOCUMENTS

| | | | |
|---|---|---|---|
| 2007/0202880 A1 | 8/2007 | Seo et al. | |
| 2008/0088500 A1 | 4/2008 | Ishii et al. | |
| 2008/0296745 A1* | 12/2008 | Kawamura | G06K 19/0723 257/666 |
| 2009/0213724 A1* | 8/2009 | Swarts | H04L 25/03159 370/210 |
| 2010/0136932 A1* | 6/2010 | Osterling | H01Q 21/28 455/115.1 |
| 2010/0223522 A1* | 9/2010 | Duggan | H04L 1/0021 714/748 |
| 2010/0329379 A1* | 12/2010 | Pham | H04B 7/0617 375/267 |
| 2011/0019723 A1* | 1/2011 | Lerner | H04B 7/0871 375/219 |
| 2013/0044650 A1* | 2/2013 | Barker | H04B 7/0617 370/278 |
| 2013/0194143 A1* | 8/2013 | Bungo | H01Q 21/28 343/725 |
| 2013/0207844 A1 | 8/2013 | Lee et al. | |
| 2013/0243055 A1 | 9/2013 | Choi et al. | |
| 2013/0300625 A1* | 11/2013 | Wong | H01Q 1/243 343/848 |
| 2014/0079098 A1* | 3/2014 | Harjani | H04B 1/001 375/219 |

FOREIGN PATENT DOCUMENTS

| | | |
|---|---|---|
| JP | 2004-012362 A | 1/2004 |
| JP | 2010-216884 A | 9/2010 |
| KR | 10-2012-0035907 A | 4/2012 |
| KR | 10-2013-0094165 A | 8/2013 |
| WO | 2006/134912 A1 | 12/2006 |

\* cited by examiner

APPARATUS AND METHOD FOR ESTIMATING DIRECTION OF RADIO FREQUENCY SIGNAL

CROSS-REFERENCE TO RELATED APPLICATION

This application claims the benefit of Korean Patent Application No. 10-2014-0032554, filed Mar. 20, 2014, which is hereby incorporated by reference in its entirety into this application.

BACKGROUND OF THE INVENTION

1. Technical Field

The present invention relates generally to an apparatus and method for estimating the direction of an RF signal and, more particularly, to an apparatus and method for estimating the direction of an RF signal via a slit antenna or multiple-input and multiple-output (MIMO) antennas.

2. Description of the Related Art

Methods of estimating the direction of a signal include a method using a directional antenna and a method using a MIMO antenna array.

The method using a directional antenna is a technique for estimating the direction of a signal using a gyro or a compass based on the characteristic in which a directional antenna itself exhibits a gain direction in a specific direction. Directional antennas include a dish type, such as a satellite antenna, an array type, such as a Yagi antenna, and a curved type antenna for the concentration of signals. The method using the directional antenna can estimate the direction of a signal using a technique for enhancing the gain of the antenna in a specific direction.

In contrast, a technique for independently receiving signals of MIMO antennas, combining the received signals, assigning weights so that the magnitude of a specific signal is maximized, and merging the signals of the antennas is referred to as a beamforming technique.

The beamforming technique is widely used recently because it is advantageous in that the pattern of signal reception gain may be controlled by controlling a weight applied to each antenna even without directly rotating the direction of an antenna.

When signals of antennas are independently received, as in a beamforming technique, an MIMO antenna type technique is implemented using spatial multiplexing as in recent mobile communication, and a larger amount of data can be transmitted and received using the MIMO antenna type technique. As another technique, a method of combining independent signals based on fixed weights is also used to obtain diversity gain regarding signals.

For example, Korean Patent Application Publication No. 2012-0035907 entitled "Apparatus for Software-Defined Radio Terminal Supporting Direction of Arrival Estimation Algorithms and Method for Distributing and Installing Software-Defined Radio Terminal Applications" describes a software-defined radio (SDR) terminal of an SDR MIMO antenna system for the direction of arrival (DOA) and a method of distributing and installing SDR terminal applications.

If MIMO antennas are used, a number of RF receivers equal to the number of MIMO antennas are used. Accordingly, a disadvantage arises in that the complexity of hardware increases by the number of MIMO antennas. One technique that has been proposed to deal with this disadvantage is to split each antenna in terms of time and then collect signals. That is, signals received from respective antennas are not sampled at the same time, but the signals are sequentially received from the respective antennas on a per-sample basis. In this case, processing can be performed by increasing a sampling rate according to the number of antennas, instead of increasing the complexity of hardware.

SUMMARY OF THE INVENTION

Accordingly, the present invention has been made keeping in mind the above problems occurring in the conventional art, and an object of the present invention is to provide an apparatus and method for estimating the direction of an RF signal via a slit antenna or MIMO antennas.

In accordance with an aspect of the present invention, there is provided a method of estimating the direction of a radio frequency (RF) signal, including receiving an RF signal from at least one antenna; performing preliminary correction depending on whether the at least one antenna is an antenna having directional gain; generating an analog signal by performing a frequency shift on the RF signal or a signal on which the preliminary correction has been performed; converting the analog signal into a digital sample; and extracting the phase of the antenna from the digital sample, and estimating the direction of the RF signal based on the extracted phase.

Performing the preliminary correction may include, when the at least one antenna is an MIMO antenna array having no directional gain, shifting frequencies of received signals of respective antennas of the MIMO antenna array or converting phases of the received signals, and merging the shifted or converted signals of the antennas into a single signal.

Performing the preliminary correction may include, when the at least one antenna is a slit antenna having directional gain, performing no processing on the RF signal.

The slit antenna may include a structure for external shielding; the inside of the structure performs electric wave absorption; and the structure may include at least one slit aligned with an antenna.

Converting the analog signal into the digital sample may include extracting a signal of each antenna, whose frequency has been shifted, from the digital sample; and estimating a delay time between the antennas based on the extracted signal.

Converting the analog signal into the digital sample may include converting the analog signal into the digital sample using a sampling rate set in accordance with a bandwidth of the analog signal.

In accordance with another aspect of the present invention, there is provided an apparatus for estimating a direction of an RF signal, including an antenna unit configured to receive an RF signal from at least one antenna; a preliminary correction unit configured to perform preliminary correction depending on whether the at least one antenna is an antenna having directional gain; a signal processing unit configured to generate an analog signal by performing a frequency shift on the RF signal or a signal on which the preliminary correction has been performed; a conversion unit configured to convert the analog signal into a digital sample; and a signal direction estimation unit configured to extract the phase of the antenna from the digital sample, and to estimate the direction of the RF signal based on the extracted phase.

The preliminary correction unit may be further configured to, when the antenna unit receives the RF signal from an MIMO antenna array having no directional gain, shift frequencies of received signals of respective antennas of the MIMO antenna array or convert phases of the received signals and then merge the shifted or converted signals of the antennas into a single signal.

The preliminary correction unit may be further configured to, when the antenna unit receives the RF signal from a slit antenna having directional gain, perform no processing on the RF signal.

The slit antenna may include a structure for external shielding; the inside of the structure may perform electric wave absorption; and the structure may include at least one slit aligned with an antenna.

The conversion unit may be further configured to extract a signal of each antenna, whose frequency has been shifted, from the digital sample and to estimate a delay time between the antennas based on the extracted signal.

The conversion unit may be further configured to convert the analog signal into the digital sample using a sampling rate set in accordance with a bandwidth of the analog signal.

BRIEF DESCRIPTION OF THE DRAWINGS

The above and other objects, features and advantages of the present invention will be more clearly understood from the following detailed description taken in conjunction with the accompanying drawings, in which.

Figure 1:
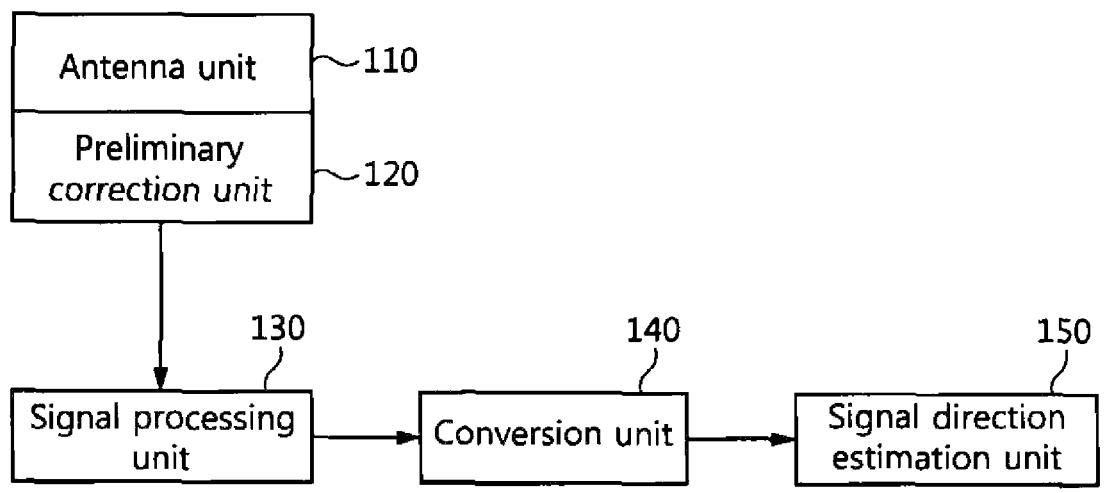
FIG. 1 is a diagram schematically illustrating the configuration of an apparatus for estimating the direction of an RF signal according to an embodiment of the present invention.

DESCRIPTION OF THE PREFERRED
EMBODIMENTS

The present invention is described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

An apparatus and method for estimating the direction of an RF signal according to embodiments of the present invention are described below with reference to the accompanying drawings.

FIG. 1 is a diagram schematically illustrating the configuration of an apparatus for estimating the direction of an RF signal according to an embodiment of the present invention.

Referring to FIG. 1, the apparatus for estimating the direction of an RF signal includes an antenna unit 110, a preliminary correction unit 120, a signal processing unit 130, a conversion unit 140, and a signal direction estimation unit 150.

The antenna unit 110 includes at least one antenna, and receives an RF signal using the at least one antenna.

If the antenna is one in number, the antenna itself needs to have directional gain, that is, directionality.

In an antenna having directionality, that is, a directional antenna, signal reception gain needs to change depending on the direction of the antenna, as in a common dish type antenna, a Yagi antenna, or a curved antenna. Furthermore, in order to determine the direction of the antenna, a gyro or a compass needs to be attached to the antenna, and thus the antenna angle needs to be measured.

If MIMO antennas are used, each individual antenna does not have directionality. An omni-directional antenna capable of receiving signals in all directions may be preferably used, and the results of the estimation of the direction of a signal become clearer depending on the number of antennas.

When the antenna unit 110 includes a single antenna, the preliminary correction unit 120 functions as a simple bypass circuit. In contrast, when the antenna unit 110 includes a plurality of antennas, the preliminary correction unit 120 shifts the frequency of a received signal of each antenna or converts the phase of a received signal of each antenna, and merges signals of the plurality of antennas into a single signal.

The signal processing unit 130 corresponds to a common RF signal receiver, and may have a structure, such as a heterodyne-type structure or a direct conversion-type structure.

The signal processing unit 130 performs a frequency shift and filtering on a received RF signal so that a target signal is present at a set frequency value. Furthermore, the signal processing unit 130 controls the gain of the received RF signal so that the magnitude of the RF signal falls within the input range of the conversion unit 140.

The conversion unit 140 converts a signal received from the signal processing unit 130, that is, an analog signal, into a digital sample. In this case, a sampling rate needs to be determined in accordance with the bandwidth of the analog signal that is received during the process of converting the analog signal into the digital sample.

The signal direction estimation unit 150 extracts the phase of the corresponding antenna from a digital sample, and estimates the direction of the signal based on the extracted phase.

A slit antenna applied to the case where the antenna unit 110 includes a single directional antenna is described in detail below with reference to FIG. 2.

Figure 2:
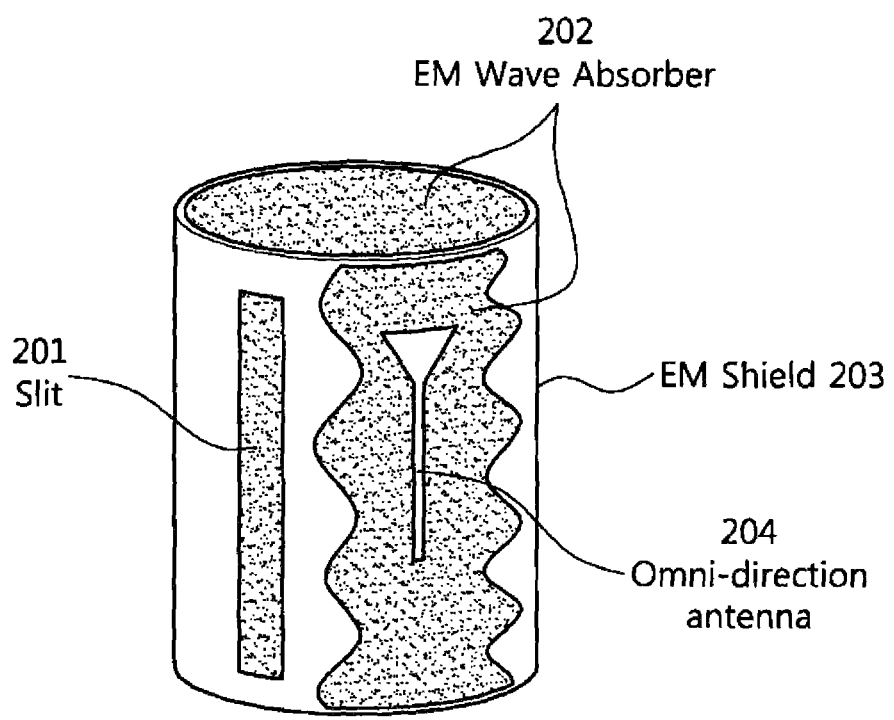
FIG. 2 is a diagram illustrating a slit antenna according to an embodiment of the present invention.

FIG. 2 is a diagram illustrating a slit antenna according to an embodiment of the present invention.

First, in the apparatus for estimating the direction of an RF signal according to the embodiment of the present invention, when a slit antenna is used in the antenna unit 110, the preliminary correction unit 120 is, not used. Furthermore, the conversion unit 140 estimates the direction of a received signal based on information about the angle of the directional antenna and the strength of a signal received at the corresponding angle. The slit antenna used in this structure is illustrated in FIG. 2.

Referring to FIG. 2, an antenna used inside the slit antenna may be an omni-directional antenna 204. When a directional antenna is used within the slit antenna, there may be difficulty with implementation because the direction of the directional antenna needs to be identical to the direction of the slit 201 of an electromagnetic (EM) shield 203.

The EM shield 203 is made of metallic material, and should not transmit electromagnetic waves. Accordingly, the EM shield 203 is fabricated to surround all the surfaces of an internal antenna. Furthermore, the inside wall of the EM shield needs to be processed using a substance capable of absorbing electromagnetic waves so that reflected waves do not reach the internal antenna. The slit 201 of the EM shield 203 is open so that electromagnetic waves enter only in a specific direction. Since waves other than waves in the case where the hole of the slit 201 and the antenna precisely form a straight line are received, the electromagnetic waves that pass through the slit 201 have relative strength differences because they experience scattering and diffraction. Furthermore, a signal that reaches the antenna becomes very weak because electromagnetic waves incident at an angle different from the direction of the antenna are absorbed by the inside wall of the shield.

The slit antenna is configured to be able to receive only a signal in a specific direction based on the above principle. The total size of the slit antenna implemented based on the shield depends on the size of the omni-directional antenna 204. The angle of a direction in which signal strength is highest can be obtained based on values obtained by a gyro, a compass or a potentiometer that is configured to be able to detect the rotation of the direction of the slit 201 and is attached to the EM shield 203.

Accordingly, in the apparatus for estimating the direction of an RF signal according to an embodiment of the present invention, the EM shield 203 configured to surround the omni-directional antenna 204 is added, and the inside of the EM shield 203 is processed using an EM absorber 202 so that electric waves can be absorbed. Furthermore, the slit 201 through which electric waves may pass is disposed in the EM shield 203 so that the direction of the slit 201 is identical to that of the antenna. Furthermore, the direction of the EM shield 203 is computed using a gyro or a compass attached to the EM shield 203. Alternatively, if the antenna is fixed to a specific part, an electronic device, for example, a potentiometer, is attached in order to obtain the relative direction of the EM shield 203 and equipment so that the relative direction may be read by the equipment. A signal may be received in each direction in such a way as to rotate the EM shield of the antenna or rotate the antenna itself.

A process of estimating the direction of an RF signal that is applied to the case where the antenna unit 110 includes MIMO antennas is described in detail below with reference to FIGS. 3 to 6.

Figure 3:
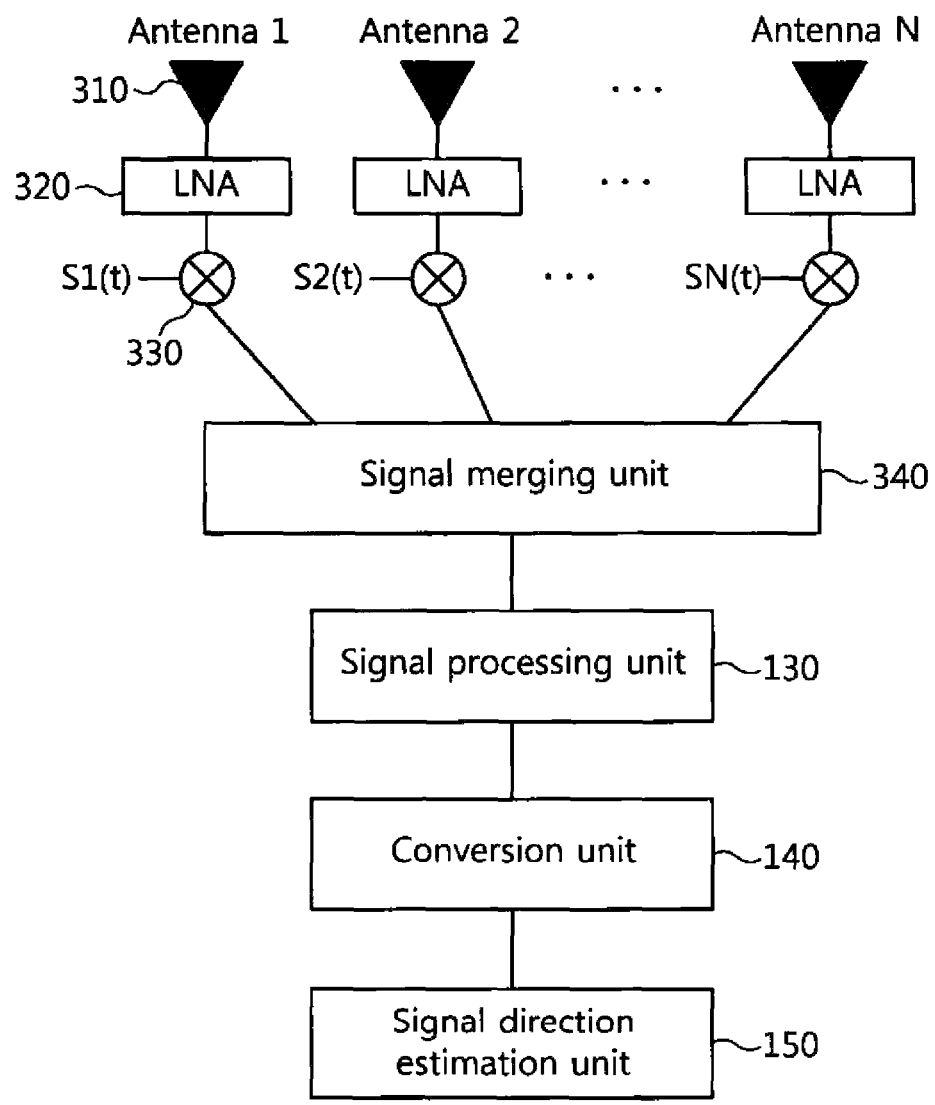
FIG. 3 is a diagram illustrating a process of estimating the direction of an RF signal based on a frequency shift according to an embodiment of the present invention.

FIG. 3 is a diagram illustrating a process of estimating the direction of an RF signal based on a frequency shift according to an embodiment of the present invention.

Referring to FIG. 3, MIMO antennas Antenna 1 to Antenna 1 N 310 receive respective RF signals.

The preliminary correction unit 120 according to an embodiment of the present invention may include low noise amplifiers (LNAs) 320, mixers 330, and a signal merging unit 340, as illustrated in FIG. 3, but is not limited to this configuration.

The LNAs 320 amplify the respective RF signals received through the MIMO antennas Antenna 1~Antenna 1 N 310.

The mixers 330 multiply the signals, amplified by the LNAs 320, by s1($t$), s2($t$), . . . , sN(t) corresponding to respective local signals. In this case, each of the multiplied local signals is a single tone signal for a frequency shift. When a local signal is generated, it is desirable for the local signal to have the same frequency and phase synchronization as a signal generated by the same reference PLL.

Figure 4:
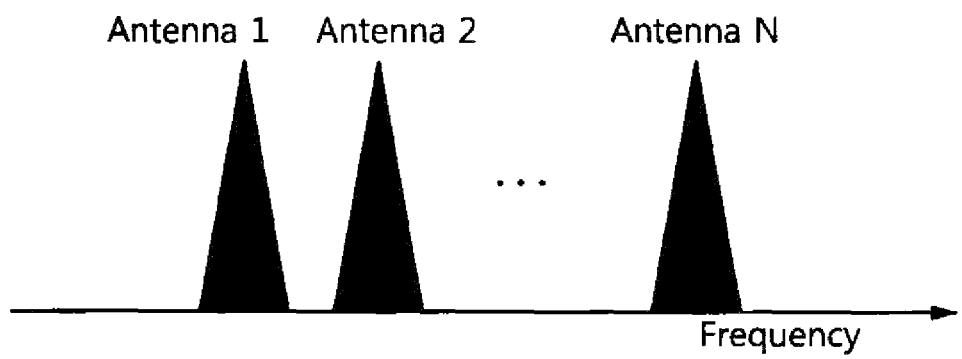
FIG. 4 is a diagram illustrating the frequency of a single tone signal that is applied to a process of estimating the direction of an RF signal based on a frequency shift according to an embodiment of the present invention.

The frequencies of the single tone signals may be set as desired, but may be provided with sufficient frequency intervals so that the spectra of the frequencies do not overlap each other, as in FIG. 4. Accordingly, the single tone signals may have frequencies that are spaced apart from each other at least by the bandwidth of a single tone signal.

The signal merging unit 340 needs to multiply the conjugates of the local signals s1($t$), s2($t$), . . . , sN(t) by which the signals of the respective antennas have been multiplied in order to extract the signals of the antennas. However, local signals are newly generated in the digital domain because the precise phases of the actually multiplied local signals are unable to be determined. In this case, the newly generated local signals need to have the same phase and frequency synchronization.

The signal merging unit 340 merges the multiplied signals into a single signal through addition, subtraction and multiplication, as in the multiplication of the conjugates, and transfers the result of the merging to the signal processing unit 130.

Assuming that a target input to the signal processing unit 130, that is, an RF signal, is w(t), the results of signals that have passed through the antennas 310 and the LNAs 320 and that have been multiplied by the local signals are given by the following Equation 1:

$$a_k(t)=s_k(t)^*G_k w(t-d_k)=G_k \exp(j2\pi f_k t)w(t-d_k) \quad (1)$$

In Equation 1, $d_k$ is a time difference between the time at which a signal reaches a k-th antenna and the time at which the signal has passed through a corresponding LNA. $f_k$ is the frequency of a local signal by which the signal of a k-th antenna is multiplied. In order to restore the above signal, an operation is performed in the digital domain, as expressed in Equation 2:

$$b_k(t)=\exp(j\theta)s_k^*(t)a_k(t)=G_k\exp(j\theta)w(t-d_k) \quad (2)$$

In Equation 2, exp(jθ) is a reference phase value that is always used to remove all local signals. A signal delay time may be estimated by comparing $b_k(t)$ corresponding to the restored signal with each of the signals of the antennas. Assuming that the sampling rate of the conversion unit 140 is considerably higher than the bandwidth of w(t), delay may be estimated by applying interpolation to the signal. First, assuming that a delay difference has been obtained on a per-sample basis, delay at a sub-sample level may be computed by Equation 3:

$$M_{i,j}(\tau_{i,j} = \tau_i - \tau_j) = \sum_{k=0}^{N-1} |b_i(k) + (b_i(k) - b_i(k-1))\tau_i - \quad (3)$$

$$\hat{\tau}_{i,j} = \underset{\tau_{i,j}}{\text{argmin}} M_{i,j}(\tau_{i,j}) \overset{b_j(k) + (b_j(k) + (b_j(k) - b_j(k-1))\tau_j|^2}{}$$

A precise value may be estimated using Equation 3 in proportion to an increase in the length of sample data. Furthermore, the search unit of $\tau_{i,j}$ may be designated based on the precision of delay to be estimated.

For example, if a direction vertical to the vector that connects two antennas is set to 0 degrees, the reception direction of the signal is obtained by Equation 4:

$$\varpi_{i,j} = \cos^{-1}\left(\frac{\hat{\tau}_{i,j}}{\tau_{i,j}^{MAX}}\right) \quad (4)$$

Referring to Equation 4, $\tau_{i,j}^{MAX}$ a maximum time it takes for an electric wave to travel the distance between the antennas. When the number of antennas is two or more, the direction of the signal may be more precisely estimated by combining a plurality of $\overline{\varpi}_{i,j}$ calculated depending on a method of disposing the antenna.

Figure 5:
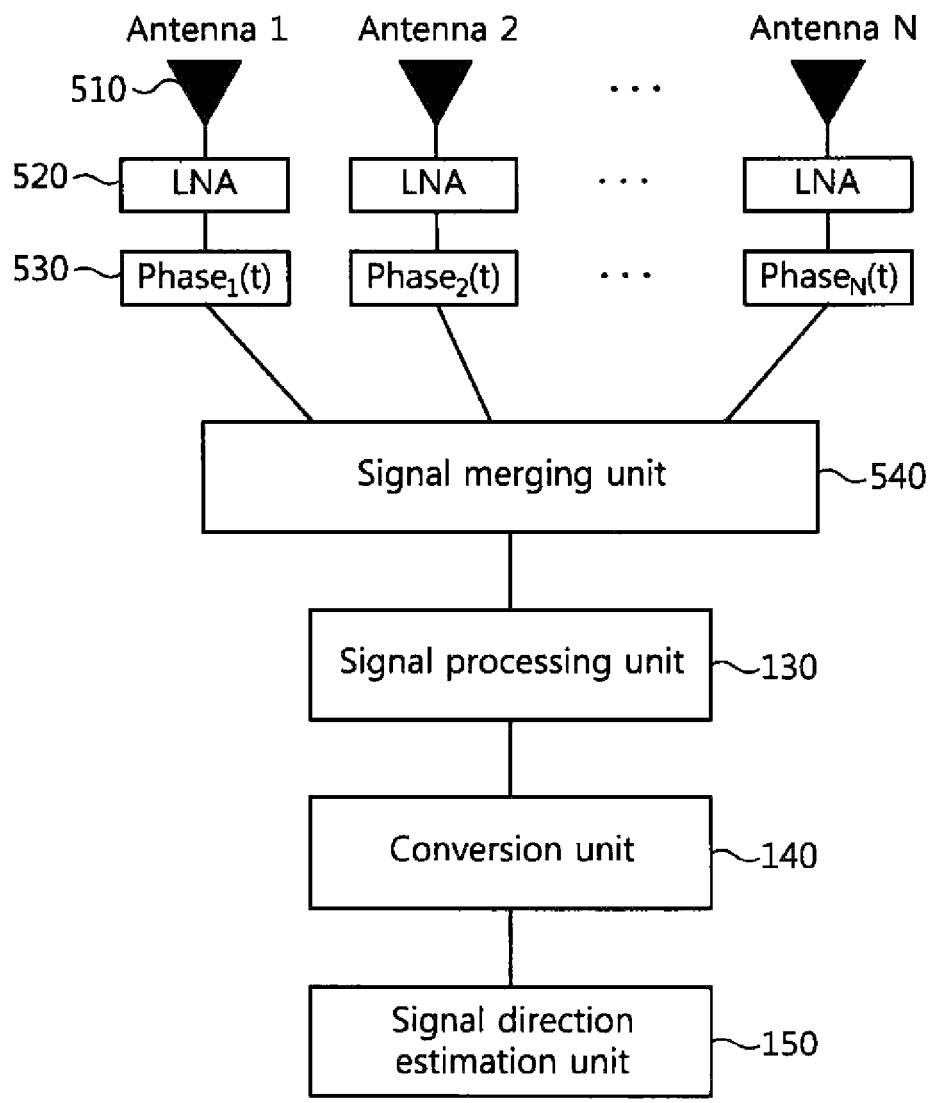
FIG. 5 is a diagram illustrating a process of estimating the direction of an RF signal based on a phase shift according to an embodiment of the present invention.

FIG. 5 is a diagram illustrating a process of estimating the direction of an RF signal based on phase shift according to an embodiment of the present invention.

When MIMO antennas are used and the direction of an RF signal is estimated based on frequency shift as described with reference to FIG. 3, there is a need for a frequency spectrum that corresponds N times the bandwidth of a target signal. A surrounding frequency space may be insufficient depending on the location of the frequency of an actual target signal. In this case, if a process, such as that of FIG. 3, is applied, performance may be reduced due to the interference between signals. Accordingly, FIG. 5 proposes a method of changing the phase of a signal without shifting frequency.

The process proposed by FIG. 5 is configured such that a change in the bandwidth used is minimized.

The difference between the method of estimating the direction of an RF signal based on phase shift and the method of estimating the direction of an RF signal based on frequency shift proposed by FIG. 3 is that a local signal, such as a single tone signal, is not multiplied for a frequency shift, but only the phase of the signal of each antenna is changed.

Figure 6:
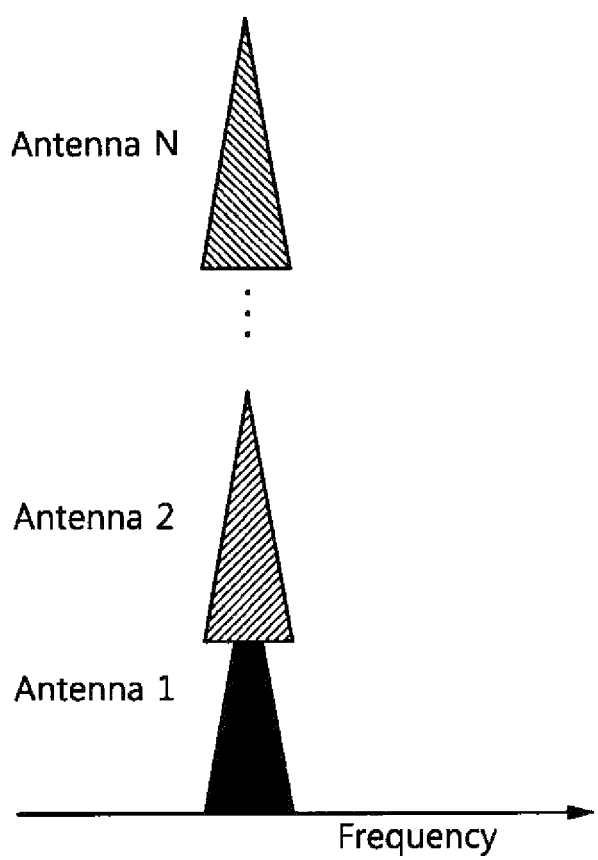
FIG. 6 is a diagram illustrating the frequency of a single tone signal that is applied to a process of estimating the direction of an RF signal based on a phase shift according to an embodiment of the present invention.

Referring to FIG. 5, phase shift units 530 shift the phases of respective signals amplified by LNAs 520. The phase shift unit 530 may be represented by a function, such as "phase_k(t)", but is not limited thereto.

phase_k(t) may be a different phase for each antenna, or may be the same phase for all the antennas. All times at which the phases are applied need to be synchronized. phase_k(t) is shifted over time, but the number of the shifts of the phases need to be the same as or larger than the number of antennas. Since only the phases of the signals have been shifted, the results obtained by adding all the signals have a form in which the signals of respective antennas are mixed at the same frequency location, as illustrated in FIG. 6. Accordingly, an advantage arises in that the bandwidth of a frequency to be processed is wider than w(t), that is, the original target signal.

Figure 7:
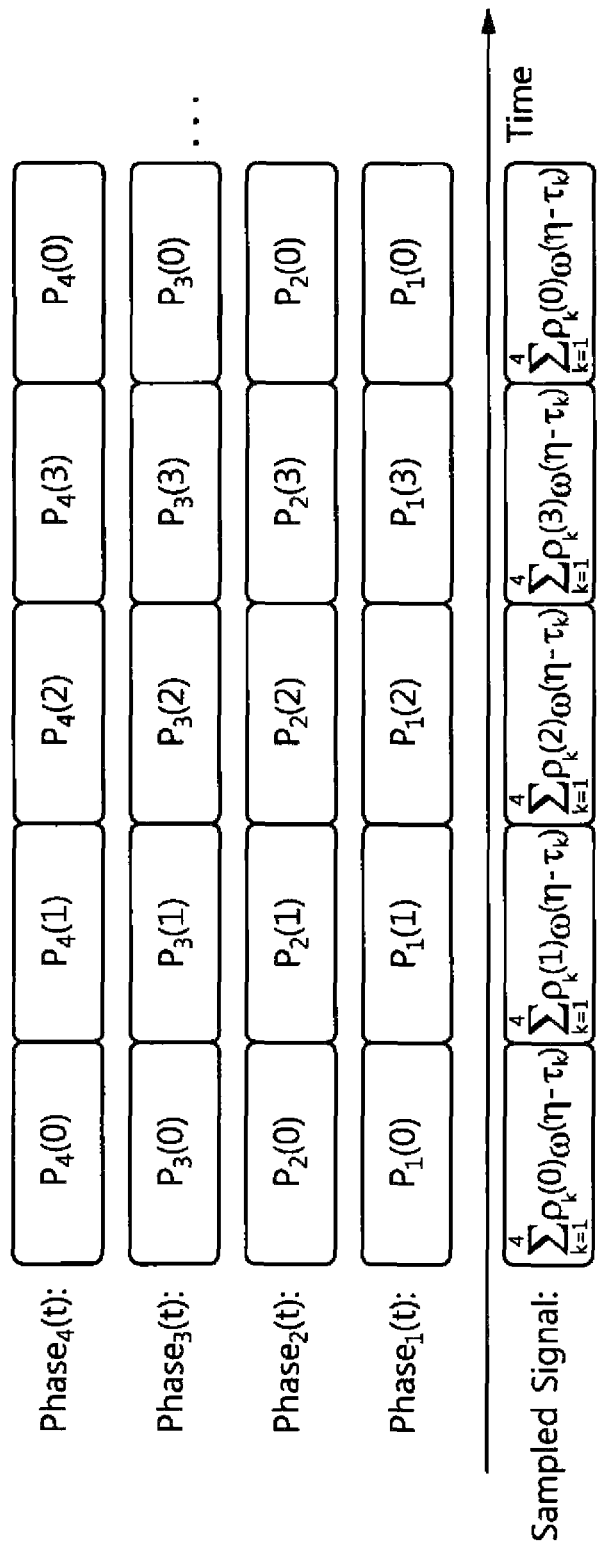
FIG. 7 is a diagram illustrating a phase shift-based synthesized signal when four MIMO antennas are used according to an embodiment of the present invention.

Accordingly, signals received over time may be represented, as illustrated in FIG. 7. The phases of the antennas are automatically changed into different phases at specific time intervals, and a point of time at which the phase is changed is the same in all the antennas. Furthermore, a number of independent sequences equal to at least the number of antennas need to be generated.

A method of estimating the direction of an RF signal in a repeated signal structure may be implemented, as illustrated in FIG. 7. This method is described in detail below with reference to FIG. 7.

FIG. 7 is a diagram illustrating a phase shift-based synthesized signal when four MIMO antennas are used according to an embodiment of the present invention.

Referring to FIG. 7, w(t) is assumed to be a single tone signal. In this case, when a signal is filtered using a narrow band and only a short time length is monitored even when the signal is not an actual single tone signal, the section in which the signal looks like a single tone signal may be obtained. In this case, when the signal is monitored from a baseband based on a digital sample, a signal "a(n)" may be obtained by Equation 5:

$$a(n) = \sum_{k=1}^{N} p_k(n)\theta_k \quad (5)$$

Referring to Equation 5, $\theta_k$ is a phase value generated when a single tone signal, that is, w(t), reaches the antenna. The phase value does not change over time. $P_k(n)$ is a phase shift value applied to a k-th antenna signal at an n-th time. A phase, such as that of Equation 6, may be obtained by combining several signals "a(n)":

$$A(n) = P(n)\Theta \quad (6)$$

$$P(n) = \begin{pmatrix} p_1(n) & p_1(n-1) & \dots & p_1(n-N+1) \\ p_2(n) & p_2(n-1) & \dots & p_2(n-N+1) \\ \dots & \dots & \dots & \dots \\ p_N(n) & p_N(n-1) & \dots & p_N(n-N+1) \end{pmatrix}$$

$$\Theta = (\theta_1, \theta_2, \dots, \theta_N)^T$$

$$\Theta = P^{-1}(n)A(n)$$

Referring to Equation 6, P(n) needs to be a full rank. In this case, phase_k(t) may have an appropriate phase value based on the number of antennas so that full rank conditions are satisfied. In such an embodiment, the value of phase_k(t) may be determined so that P(n) becomes a fast Fourier transform matrix. In another embodiment, P(n) may be defined so that it becomes a Walsh matrix. In this case, the number of antennas is 2^n. In addition, any combination of phases that may produce the full rank is possible. The Walsh matrix is used as in Equation 7:

$$W_2 = \begin{pmatrix} 1 & 1 \\ 1 & -1 \end{pmatrix} \quad (7)$$

$$W_N = \begin{pmatrix} W_{N/2} & W_{N/2} \\ W_{N/2} & -W_{N/2} \end{pmatrix}$$

When the full rank is obtained, $\Theta$ may be easily obtained from the above equation. The phase may be inversely converted into a time difference using the actual value of the frequency of w(t) based on $\Theta$. When a time difference between the antennas is given, the relative direction of signals may be obtained. When three or more antennas are used, a unique 2-D direction may be estimated.

When the direction is estimated using phase shift, information needs to be exchanged between a digital stage and a corresponding phase. That is, the phase that is currently being applied to an antenna signal needs to be determined. One of the methods for synchronizing the phase and the antenna signal is to directly receive information about the phase that is currently being applied in the digital stage from the values of phase_k(t). In order to obtain information about the phase using a different method, phase_k(t) is configured so that the size "0" may be selected. In this case, a point of time at which a section not including a signal is changed into a section including a signal becomes the start point, that is, the section in which the phase is applied to the values of phase_k(t). In this case, information about the phase applied to phase_k(t) does not need to be directly read from the digital stage.

Figure 8:
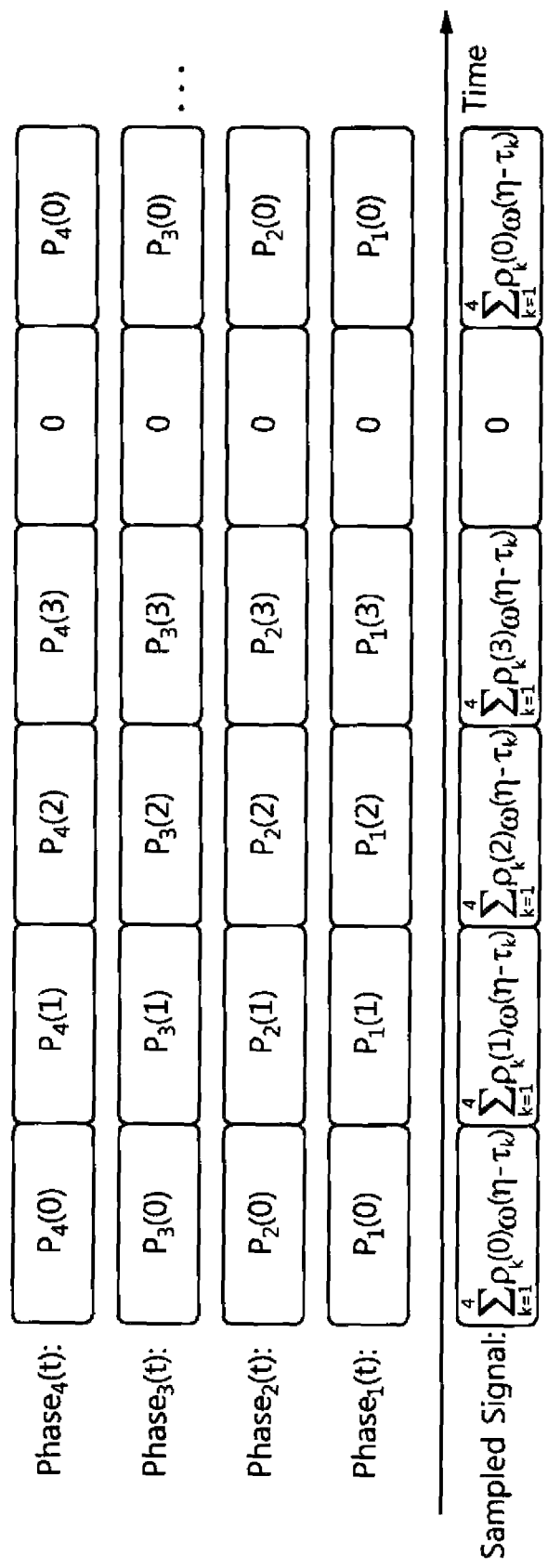
FIG. 8 is a diagram illustrating an example of a structure in which the size of a phase shift-based synthesized signal becomes 0 in a single time location when four MIMO antennas are used according to an embodiment of the present invention.

FIG. 8 illustrates an example of a structure in which a signal size becomes 0 at a single time location.

Referring to FIG. 8, the start location of a direction estimation algorithm may be easily determined because whether or not a signal is present has been synchronized.

Furthermore, in the case of a phase shift, to perform signal processing using actual w(t) may be difficult because a target signal w(t) is modified and then received. In order to overcome such a difficulty, a method of compensating for estimated delay information may be used. Instead, two frequency locations may be used to overcome such the difficulty, as in a frequency shift method. That is, the frequency and phase of a single signal that is a reference are not changed, and, when a combination signal of the antennas is generated, the frequency of the combined signal may be shifted to a specific different location and, at the same time, the phase of the combined signal may be changed. In this case, the shift of the frequency may be applied to the reference signal, and only the shift of the phase may be applied to the combined signal. In this case, a method of obtaining the reference signal using a separate external antenna may be used. Instead, a specific antenna may simply split a signal into two signals, and one of the two signals may be used as a reference and the other may be used for an antenna signal combination.

A method of estimating the direction of an RF signal is described in detail below with reference to FIG. 9.

Figure 9:
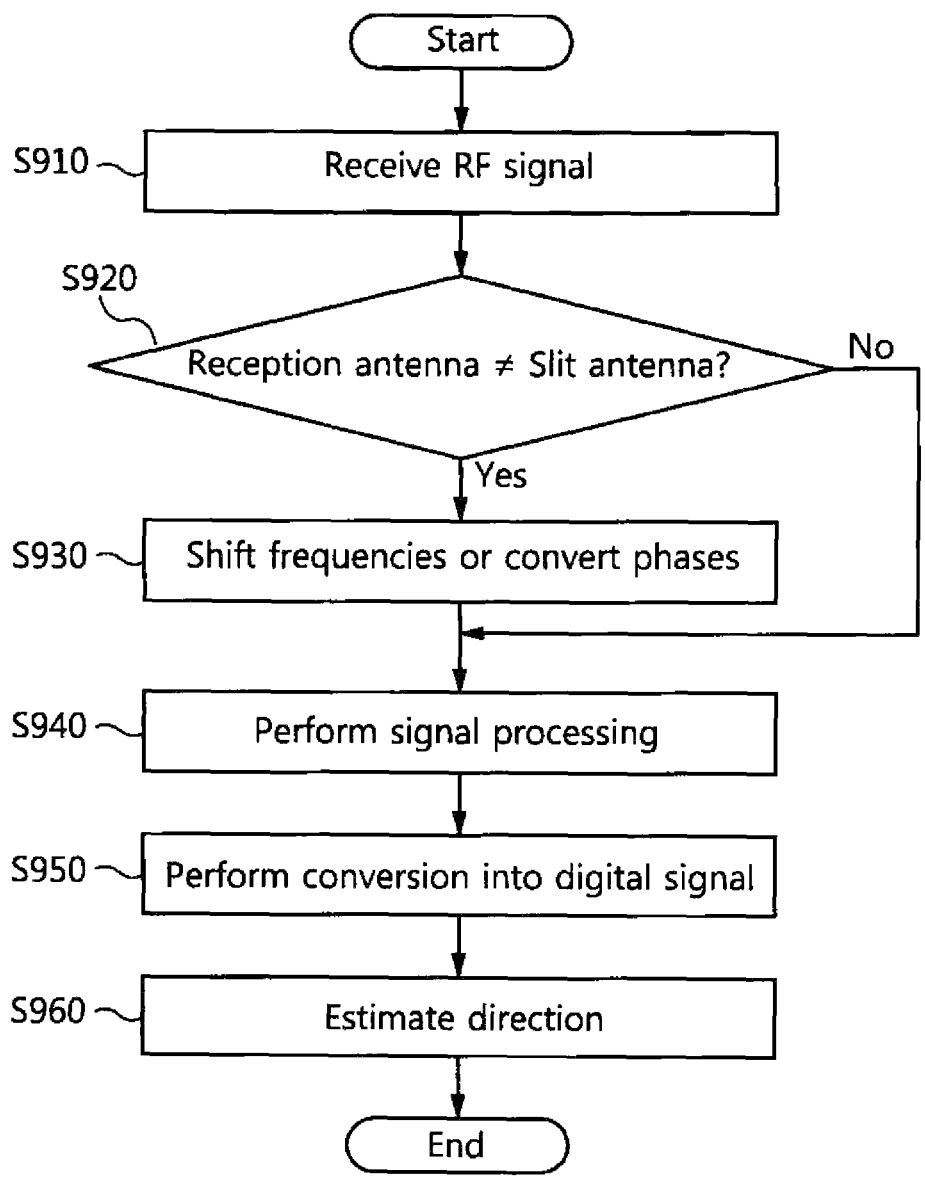
FIG. 9 is a flowchart illustrating a method of estimating the direction of an RF signal according to an embodiment of the present invention.

FIG. 9 is a flowchart illustrating a method of estimating the direction of an RF signal according to an embodiment of the present invention.

Referring to FIG. 9, the apparatus for estimating the direction of an RF signal receives an RF signal using at least one antenna at step S910.

The apparatus for estimating the direction of an RF signal checks whether or not the antenna that has received the RF signal at step S910 is a directional antenna having directional gain, that is, a slit antenna, at step S920.

If, as a result of the checking, it is determined that the antenna that has received the RF signal is not a directional antenna having directional gain, that is, the RF signals have been received using MIMO antennas, the apparatus for estimating the direction of an RF signal shifts the frequencies of the received signals of the MIMO antennas or converts the phases of the received signals, and merges the shifted or converted signals into a single signal at step S930.

The apparatus for estimating the direction of an RF signal performs signal processing, such as frequency shift and filtering, on the signal merged at step S930 or a signal received through the slit antenna at step S910 so that the signal is present at a set frequency value at step S940.

The apparatus for estimating the direction of an RF signal converts the analog signal on which the signal processing processes have been performed at step S940 into a digital sample at step S950. A sampling rate needs to be determined in accordance with the bandwidth of the analog signal that is received in a process of converting the analog signal into the digital sample as in step S950.

The apparatus for estimating the direction of an RF signal extracts the phase of a corresponding antenna from the digital sample obtained at step S950, and estimates the direction of the signal based on the extracted phase at step S960.

As described above, this embodiment of the present invention includes receiving an RF signal from each antenna, processing the RF signal, converting a signal shifted to a baseband or an IF band into a digital signal, and estimating the direction of a signal through the signal processing of the converted digital data.

If only typical RF signal processing is performed, an antenna needs to have directionality in order to be aware of the direction of a signal. A slit-type antenna is proposed as an antenna that provides information about the direction of a signal. A conventional directional antenna has a structure that is capable of collecting signals in order to enhance a signal in a specific direction. In contrast, the present invention proposes a technique for attenuating a signal if the signal is not a signal in a specific direction. For this purpose, the directionality of an antenna can be implemented by implementing the blocking and absorption of a signal using the slit antenna, and the size of the antenna can be made small compared to an antenna based on the conventional method of increasing a signal.

According to the technique for estimating the direction of a signal using MIMO antennas, signals can be collected by somewhat modifying RF signal processing. In this technique, a frequency shift or a phase shift can be performed on the signal of each of the MIMO antennas using a signal synchronized in the frequency domain, and the signals of the MIMO antennas can be merged into a single signal and received through the single signal processing unit 130. This technique enables signal distortion attributable to high-speed antenna switching occurring in the conventional method or an increase in the complexity of a receiver attributable to multiple RF signal processing processes to be avoided.

In accordance with an embodiment of the present invention, the apparatus and method for estimating the direction of an RF signal enables the size of a slit-type single antenna to be much smaller than that of a conventional directional antenna.

Furthermore, when MIMO antennas are used, the apparatus and method for estimating the direction of an RF signal can overcome the increasing complexity of an RF receiver attributable to an increase in the number of antennas based on a single receiver, and can also prevent the distortion of a signal attributable to switching.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method of estimating a direction of a radio frequency (RF) signal, comprising:

receiving an RF signal from at least one antenna;
performing preliminary correction when the at least one antenna has no directional gain;
generating an analog signal by performing a frequency shift on the RF signal or a signal on which the preliminary correction has been performed;
converting the analog signal into a digital sample; and
extracting a phase of the antenna from the digital sample, and estimating a direction of the RF signal based on the extracted phase,
wherein performing the preliminary correction comprises, when the at least one antenna is an MIMO antenna array having no directional gain, shifting frequencies of received signals of respective antennas of the MIMO antenna array or converting phases of the received signals, and merging the shifted or converted signals of the antennas into a single signal.

2. The method of claim 1, wherein converting the analog signal into the digital sample comprises:
extracting a signal of each antenna, whose frequency has been shifted, from the digital sample; and
estimating a delay time between the antennas based on the extracted signal.

3. The method of claim 1, wherein converting the analog signal into the digital sample comprises converting the analog signal into the digital sample using a sampling rate set in accordance with a bandwidth of the analog signal.

4. An apparatus for estimating a direction of an RF signal, comprising:
an antenna unit configured to receive an RF signal from at least one antenna;
a preliminary correction unit configured to perform preliminary correction when the at least one antenna has no directional gain;
a signal processing unit configured to generate an analog signal by performing a frequency shift on the RF signal or a signal on which the preliminary correction has been performed;
a conversion unit configured to convert the analog signal into a digital sample; and
a signal direction estimation unit configured to extract a phase of the antenna from the digital sample, and to estimate a direction of the RF signal based on the extracted phase,
wherein the preliminary correction unit is configured to, when the antenna unit receives the RF signal from an MIMO antenna array having no directional gain, shift frequencies of received signals of respective antennas of the MIMO antenna array or convert phases of the received signals and then merge the shifted or converted signals of the antennas into a single signal.

5. The apparatus of claim 4, wherein the conversion unit is further configured to:
extract a signal of each antenna, whose frequency has been shifted, from the digital sample; and
estimate a delay time between the antennas based on the extracted signal.

6. The apparatus of claim 4, wherein the conversion unit is further configured to convert the analog signal into the digital sample using a sampling rate set in accordance with a bandwidth of the analog signal.

* * * * *